No. 819,560. PATENTED MAY 1, 1906.
M. C. A. LATOUR.
METHOD OF PRODUCING A CONSTANT MAGNETIZATION BY MEANS OF ALTERNATING CURRENTS.
APPLICATION FILED SEPT. 10, 1904.
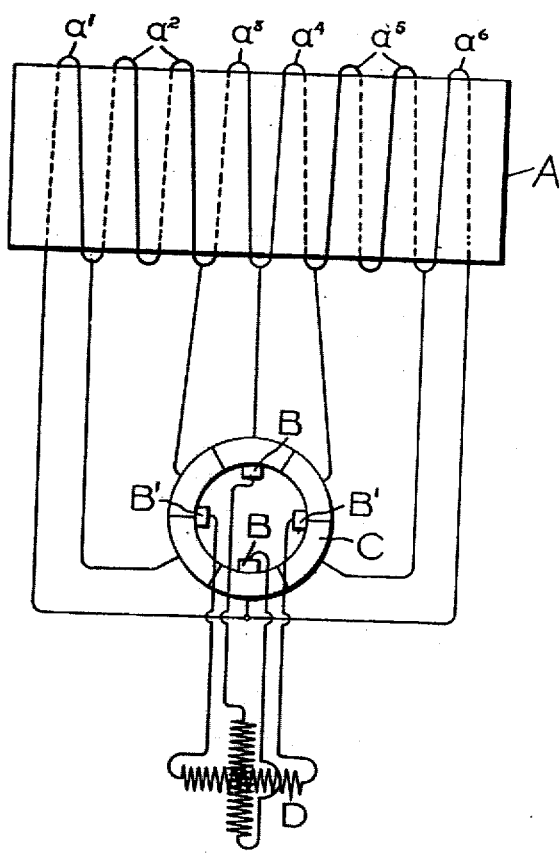
Witnesses.
Ethan E. Briggs
Helen Orford
Inventor:
Marius C. A. Latour,
by Albert␣␣␣
Atty.

UNITED STATES PATENT OFFICE.

MARIUS C. A. LATOUR, OF PARIS, FRANCE, ASSIGNOR TO GENERAL ELECTRIC COMPANY, A CORPORATION OF NEW YORK.

METHOD OF PRODUCING A CONSTANT MAGNETIZATION BY MEANS OF ALTERNATING CURRENTS.

No. 819,560.      Specification of Letters Patent.      Patented May 1, 1906.

Application filed September 10, 1904. Serial No. 223,943.

*To all whom it may concern:*

Be it known that I, MARIUS C. A. LATOUR, a citizen of France, residing at Paris, France, have invented certain new and useful Improvements in Methods of Producing a Constant Magnetization by Means of Alternating Currents, of which the following is a specification.

My invention relates to the excitation of magnetic circuits; and its object is to provide a novel method of producing a unidirectional constant flux in the magnetic circuit by means of alternating currents.

My invention is based on the mathematical truth expressed by the equation $$\sin^2 a + \cos^2 a = 1.$$

An application of this formula has been made by Hutin and Le Blanc in the invention disclosed in their patent, No. 572,510, issued December 1, 1896. In this patent they show means for converting alternating currents into direct current as follows: By means of alternating current sinusoidal flux is produced in a magnetic circuit, thereby inducing a sinusoidal electromotive force in a secondary winding carried by said magnetic circuit, and the number of effective turns of that secondary winding is simultaneously varied in accordance with the same sine function as that by which the electromotive force varies. Since the volts per coil vary with the sine function and since the number of coils in circuit vary with the same sine function, the resultant electromotive force varies as a $\sin^2$ function. By similarly producing in a second winding a voltage varying as a $\cos^2$—as, for instance, by exciting it by means of a flux displaced ninety degrees from that which excites the first winding and also by varying the effective turns in accordance with the cosine function and by connecting the two windings in series the electromotive forces are added, and a resultant constant unidirectional voltage is obtained in accordance with the formula. Furthermore, it is shown in the above-mentioned patent that the theory is not limited to the combination of the squares of two sinusoidal functions differing in phase by ninety degrees, but is applicable in general to any polyphase arrangement. By connecting in series any number of voltages, each varying as the $\sin^2$ of the phase angle of one of a number of phases, a constant unidirectional voltage will be obtained.

By my invention I make a novel application of the theory briefly outlined above and disclosed in full in the patent referred to. By my invention a number of superimposed fluxes are produced in a single magnetic circuit, each flux varying as a $\sin^2$ of the phase angle of one of a plurality of phases. In accordance with the theory I thereby obtain a constant unidirectional flux which may be utilized for the same purposes as a similar flux as ordinarily produced by direct current.

My invention then consists in the method of producing a constant magnetization which consists in producing a plurality of superimposed fluxes each varying with the $\sin^2$ function of the phase angle of one of a number of phases.

More specifically considered, my invention consists in the method of producing a constant magnetization in a magnetic circuit which consists in supplying to the exciting winding or windings thereof polyphase voltages and simultaneously varying the effective number of turns connected to each phase of the impressed voltage in accordance with the variation of the sine of the phase angle of said voltage.

My invention will best be understood by reference to the accompanying drawing, which shows diagrammatically an arrangement adapted for producing a unidirectional magnetization in accordance with my invention.

In the drawing, A represents a portion of a magnetic circuit on which is placed a winding formed in a number of sections $a'$ to $a^n$, one-half of the sections being wound oppositely to the other half and the whole connected in a closed winding. The closed winding formed by these sections is tapped at points between adjacent sections to the segments of a six-part commutator C. B B and B′ B′ represent revolving brushes bearing on the commutator. Evidently the number of effective turns of the winding connected in circuit with the brushes will vary during the rotation of the brushes.

Considering the number of turns in each section, it will be remembered that in order to obtain a sinusoidal variation of the number of effective turns in a circuit the successive coils or sections should contain a number of turns set forth in the patent above referred to by the following expressions: No. of turns in first coil $= k \sin. a$, No. of turns in second coil $= k \sin. \left(a + \dfrac{2\pi}{n}\right)$, No. of turns in third coil $= k \sin. \left(a + \dfrac{4\pi}{n}\right)$, &c., $k$ being a constant and $n$ being the number of coils.

Now in order to take a simple example let $a = \dfrac{\pi}{n}$, $n = 6$, and $k = 2$. Substituting these values in the expressions given above, the number of turns in each coil or section will be as follows: 1, 2, 1, −1, −2, −1. It is this arrangement that is shown in the drawing, the negative signs being taken care of by reversing the direction of winding of these sections. Of course in order to get a close approximation to a sine function a greater number of sections should be selected; but the arrangement shown will serve for the purpose of illustration. It will be seen that the two sections of two turns each are shown in heavier lines than the other sections. The purpose is to indicate that the turns are of greater cross-section. The several sections are preferably so wound that the resistances of all the sections are approximately equal, so that the ohmic resistance of the circuit will not be varied as the brushes B B revolve in the commutator C.

Now if the brushes B B are placed, as shown, on the commutator, it will be seen that the current entering and leaving the brushes divides, half going through each half of the sections and the current in all the sections assisting in producing the magnetization—that is, the total number of ampere-turns is equal to 4I, I being the current entering at the brushes. If this current is an alternating current derived from one phase of the two-phase source D, the ampere-turns at any instant will be equal to $4I \sin. a$, where I is the maximum value of the current entering the brushes. Now if the brushes B B are revolved in synchronism with the alternation of the currents entering the brushes the effective number of turns traversed by the current entering the brushes will also vary, as $\sin. a$, and the resultant ampere-turns at any instant may be expressed by $4I \sin.^2 a$. Now if a second pair of brushes B′ B′ is placed on the commutator, displaced ninety degrees from the brushes B B, and if a current is sent through this second set, derived from the other phase of source D and displaced in phase ninety degrees from the current sent through the brushes B B, a second flux would be produced corresponding to the ampere-turns, the effective value of which at any instant would be equal to $4I \cos.^2 a$ and the resultant flux would be equal to 4I—that is, the flux would be constant and unidirectional. Obviously this flux may be used for any purpose whatever for which a similar flux produced by direct current might be employed, and, furthermore, my invention is not limited to the use of two-phase currents supplied to the winding through a two-phase arrangement of brushes. Polyphase current may be supplied to the winding through a suitable arrangement of brushes to produce the desired magnetization. That any other polyphase arrangement is equivalent to the two-phase arrangement shown will be obvious to those skilled in the art and is, moreover, fully explained in Patent No. 572,510, above referred to.

Moreover, it is not essential that polyphase currents should be supplied to the commutator. If simple alternating current is supplied to one set of brushes and the other circuit is short-circuited instead of being connected to a second phase, a current will flow through this short circuit, due to induction in the exciting-winding, and the magnetomotive force due to this current will vary approximately with a $\sin.^2$ function and with the magnetomotive force due to alternating current supplied to the other brushes will produce a substantially constant flux in the magnetic circuit, though this method is not as efficient as the polyphase excitation. For my invention it is only essential to produce in the magnetic circuit a plurality of magnetomotive forces each varying as the square of a sine function, and it is immaterial whence the currents producing these magnetomotive forces are derived.

Obviously it makes no difference whether the commutator and exciting-winding are stationary and the brushes revolve, or vice versa. The number of sections of the winding may be varied, as desired, the greater the number of sections the closer the approximation to a sine variation. Furthermore, although a single winding is sufficient for producing a constant flux a greater number of windings may be used, if desired.

What I claim as new, and desire to secure by Letters Patent of the United States, is—

1. The method of producing a substantially constant unidirectional flux in a magnetic circuit, which consists in producing therein a plurality of magnetomotive forces each varying as the square of a sine function.

2. The method of producing a substantially constant unidirectional flux in a magnetic circuit, which consists in producing therein a plurality of superimposed magnetomotive forces varying respectively as the squares of the sines of the phase angles of a polyphase system.

3. The method of producing a substantially constant unidirectional flux in a magnetic circuit provided with an exciting-winding, which consists in impressing polyphase voltages on said winding and varying the number of effective turns connected to each phase of said voltages at the same rate as that at which the voltage of that phase varies.

4. The method of producing a substantially constant unidirectional flux in a magnetic circuit provided with an exciting-winding, which consists in impressing on said winding polyphase voltages and varying the number of effective turns connected to each phase of said voltages as the sine of the phase angle of the voltage of that phase.

5. The method of producing a substantially constant unidirectional flux in a magnetic circuit provided with an exciting-winding, which consists in causing polyphase currents to flow in said winding and varying the number of effective turns traversed by each of said currents in accordance with the variation in the current itself.

6. The method of producing a substantially constant unidirectional flux in a magnetic circuit provided with an exciting-winding, which consists in causing polyphase currents to flow in said winding and varying the number of effective turns traversed by each of said currents in accordance with the variation in the sine of the phase angle of the current of that phase.

7. The method of producing a substantially constant unidirectional flux in a magnetic circuit provided with an exciting-winding, which consists in causing polyphase currents to flow in said winding and varying the number of effective turns traversed by each current in accordance with the sine of the phase angle of said current, whereby a plurality of magnetomotive forces are produced each varying with the sine$^2$ of the current which produces it.

In witness whereof I have hereunto set my hand this 8th day of September, 1904.

MARIUS C. A. LATOUR.

Witnesses:
G. C. HOLLISTER,
HELEN ORFORD.